United States Patent [19]

Paukert

[11] Patent Number: 4,675,485
[45] Date of Patent: Jun. 23, 1987

[54] HANDGRIP HAVING DEAD-MAN-SWITCH ACTION FOR CONSTRUCTION EQUIPMENT

[75] Inventor: Julius Paukert, Munich, Fed. Rep. of Germany

[73] Assignee: Wacker-Werke GmbH & Co. KG, Munich, Fed. Rep. of Germany

[21] Appl. No.: 811,637

[22] Filed: Dec. 20, 1985

[30] Foreign Application Priority Data

Dec. 21, 1984 [DE] Fed. Rep. of Germany ....... 3446918

[51] Int. Cl.⁴ .............................................. H01H 21/00
[52] U.S. Cl. ....................................... 200/157; 200/4; 200/330
[58] Field of Search ................................ 200/329–332, 200/334, 157, 4; 180/272

[56] References Cited

U.S. PATENT DOCUMENTS 3,619,519 11/1971 Wiggins ................................ 200/157

Primary Examiner—Stephen Marcus
Assistant Examiner—Renee S. Luebke
Attorney, Agent, or Firm—Becker & Becker, Inc.

[57] ABSTRACT

A handgrip, having dead-man-switch action, for mounting on the pole of construction equipment. The inventive handgrip is distinguished from known handgrips by increased operating comfort, simpler construction, and a more difficult-to-circumvent safety mechanism. The handgrip has a grip member that is displaceable in a support on the pole in its longitudinal direction and against spring force. At least one of the ends of the grip member has a limited freedom of movement in the radial direction. Also provided is a positively active slide coupling that displaces the grip member in the longitudinal direction relative to the support when the grip member is displaced in the radial direction relative to the support. The longitudinal displacement of the grip member is transmitted to a switching member for drive operation.

3 Claims, 3 Drawing Figures

HANDGRIP HAVING DEAD-MAN-SWITCH ACTION FOR CONSTRUCTION EQUIPMENT

BACKGROUND OF THE INVENTION

1. Field of the Invention

The present invention relates to a handgrip, having dead-man-switch action, for mounting on the pole or shaft of self-propelled, pole-guided construction equipment, especially pole rollers.

2. Description of the Prior Art

Handgrips of this general type fulfill the function of immediately stopping the construction apparatus when the operator releases the handgrip for any reason, even unintentionally, thus avoiding accidents and injury to persons and/or damage to objects.

The heretofore known handgrips are made in two parts, comprising a stable guide or steering handle and a second, similarly shaped, lighter handle that must be pulled toward the steering handle, against spring force or pivot force, in order to actuate the driving operation and to keep the latter activated. When the two handles are released, the lighter handle either under the effect of gravity or, more likely, via a spring that is generally in the form of a torsion spring, returns to the rest position and frees a spring that was previously tensioned by the actuating lever; this spring severs the driving coupling and activates a brake, so that the roller, etc., is immediately stopped. Handgrips of this type are used not only with purely mechanical rollers, but also with hydrostatically driven rollers.

The heretofore known handgrips are structurally expensive and complex, and are not adequately safeguarded against disconnection of their function, for example by securing the lighter handle to the steering handle. The danger that the dead-man-switch safety action will be circumvented results from the fact that it is somewhat uncomfortable to hold the lighter handle against the force of gravity or spring force for any length of time. Thus if an operator is using the equipment for a long period of time, he can become quite uncomfortable, for example by having his hands cramped, and may be tempted to circumvent the dead-man-switch safeguard, especially since it is so easy to do so.

An object of the present invention therefore is to structurally simplify the handgrip of the aforementioned general type, and moreover to design the handgrip in such a way that on the one hand it is more comfortable for an operator to use, and on the other hand as a dead-man-switch safeguard that cannot be easily deactivated.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 3:
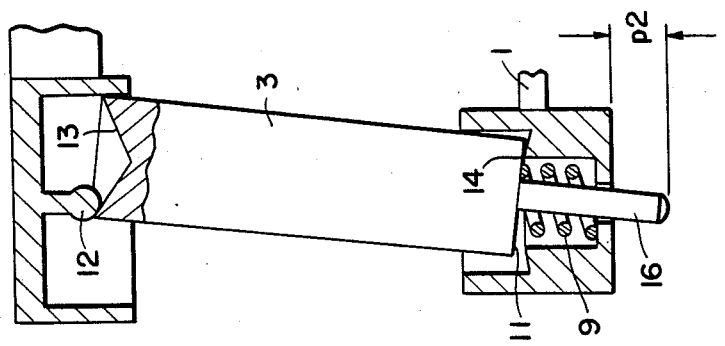
FIG. 3 is a view of the handgrip of FIG. 1 taken in the same direction as the view of FIG. 2, with the operating state in this case showing the effect of laterally acting steering forces on the grip member.

The handgrip of the present invention comprises: support means adapted to be mounted on the pole of the construction equipment, with the support means being provided with stops; a grip member that has a longitudinal dimension, and that is displaceably supported between the stops of the support means in such a way that in the operating position of the handgrip, the longitudinal dimension of the grip member is oriented substantially vertically; the grip member has a lower end, when viewed in the operating position of the handgrip, and an upper end; at least one of these ends of the grip member has a limited freedom of movement in the radial direction, i.e. substantially at right angles to the longitudinal dimension of the grip member; spring means disposed between the first end of the grip member and a first one of the stops of the support means, with the spring means urging the grip member toward a second one of the stops of the support means; positively acting slide coupling means provided between the support means and the grip member for displacing the latter relative to the support means in the longitudinal direction of the grip member and against the spring means when the grip member is shifted in the radial direction relative to the support means; and a switching member operatively connected to the grip member, and longitudinally displaceable along with the latter, for activation and deactivation of the drive operation of the construction equipment when the grip member is longitudinally displaced.

The inventive handgrip comes fully into play when the grip member is grasped by the operator and is moved away from the upper stop against the force of the spring means. Already sufficient to accomplish this, at least to a large extent, is the weight of the operator's hand and arm, so that there is no significant uncomfortable action associated with this operation.

To guide the equipment via the handgrip, the operator always has to exert relatively great forces upon the grip member in the radial direction. In so doing, it is not possible to rule out that these forces also have components directed toward the upper stop. However, due to the inventively provided slide coupling, the grip member cannot escape upwardly in this situation, which would otherwise bring about an unintended stopping of the equipment.

Due to the comfortable manner in which the inventive handgrip can be operated, the operator has no reason to try to in some way fix the position of the grip member against the spring force. Furthermore, it is also far more difficult to fix the position, against spring force, of a grip member that is displaceable in its longitudinal direction than it is to bind together two handles that are pressed together. Such a circumventing of the dead-man-switch operation can be made even more difficult if pursuant to a further inventive feature, the handgrip is surrounded with a sleeve that is mounted to the support means and is displaceable in a bellows-like manner along with the grip member.

Pursuant to yet another feature of the present invention, the slide coupling can comprise a pin that projects from the support means in the axial direction of the grip member, and in a conical recess that is provided in one end face of the grip member and faces the pin; the recess and pin are disposed in one of the ends of the grip member that is provided with limited freedom of movement in the radial direction.

In all situations, the spring force becomes effective and guides the grip member back to the upper stop when the operator releases the grip member for any reason. Via the coupling of the switching member with the activation mechanism of the equipment, this return of the grip member leads to an immediate stopping of the equipment.

DESCRIPTION OF PREFERRED EMBODIMENTS

Figure 1:
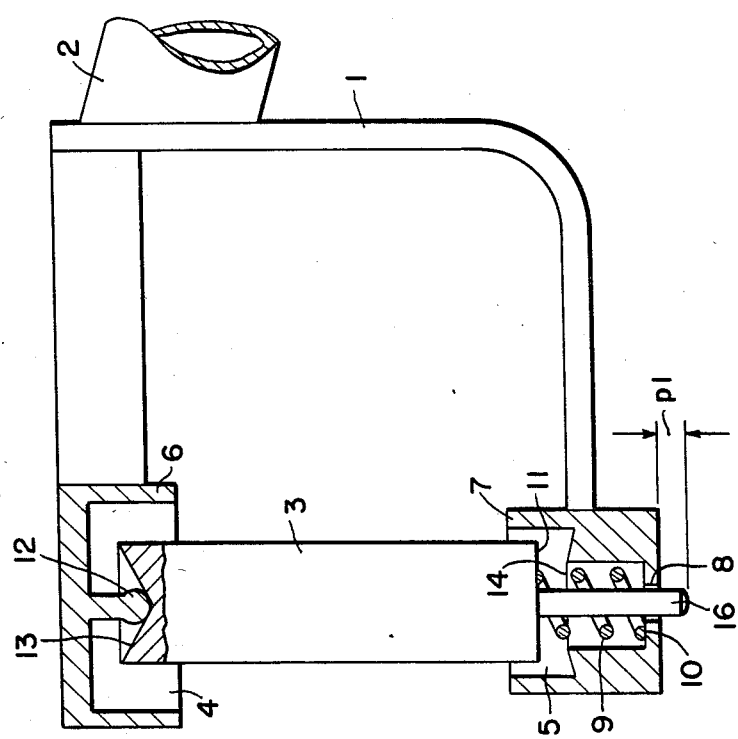
FIG. 1 is a partially sectioned side view of one exemplary embodiment of the inventive handgrip.

Referring now to the drawing in detail, the illustrated handgrip includes a frame-like support means 1 that is rigidly mounted to the pole or shaft 2 of a construction apparatus, as indicated only in FIG. 1. At the top and bottom, the support means 1 supports a grip member 3 that is oriented essentially vertically in the position of use of the handgrip. The grip member 3 extends into bores 4 and 5 in the ends 6 and 7 of the support means 1. These ends 6 and 7 extend around, and are spaced from, the upper and lower ends of the grip member 3. Both of the bores 6, 7 permit the grip member 3 to have considerable play in the lateral direction, with this play being greater in connection with the upper bore 4 than with the lower bore 5. The grip member 3 is provided with a central pin or switching member 16 that projects at right angles from its lower end face. The pin 16 projects out of the lower end 7 of the support means 1 through a hole 8. The pin 16 is surrounded by a compression spring 9 that is supported between the lower end face 11 of the grip member 3, and an annular shoulder 10 that is provided in the end 7 of the support means 1 and surrounds the hole 8. The compression spring 9 urges the grip member 3 vertically upwardly. A stop or pin 12 having a spherical head projects from the upper end 6 of the support means 1 in the axial direction of, and toward, the grip member 3. The pin 12 extends into a conical recess 13 provided in that end face of the grip member 3 opposite the end face 11. This pin 12 forms an upper stop for the grip member 3, and in conjunction with the conical recess 13 at the same time fulfills the function of a slide coupling that effects downward displacement of the grip member 3, against the force of the spring 9, when radially oriented forces are exerted upon the grip member 3.

The downward displacement of the grip member 3 is limited by a lower stop 14 that is disposed in the lower end 7 of the support means 1 and surrounds the spring 9. The amount by which the grip member 3 can be axially displaced is such that even in the lowermost position of the grip member 3, the pin 12 cannot escape the conical recess 13.

The amount of play that the grip member 3 has in the lower end 7 of the support means 1 is such that the upper end of the grip member 3 can move in the radial direction to the inner wall of the bore 4 in the upper end 6 of the support means 1, as shown in FIG. 3.

Figure 2:
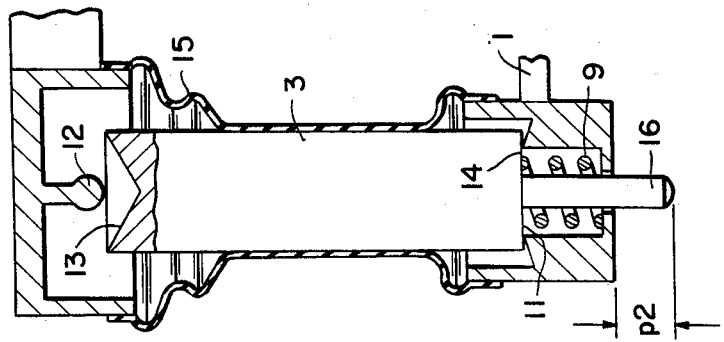
FIG. 2 is a view of the handgrip of FIG. 1 taken in the direction of movement of the construction apparatus, with the grip member of the handgrip having been displaced straight downwardly by hand.

FIG. 2 additionally shows a sleeve 15 that is secured to the ends 6 and 7 of the support means 1, surrounds the grip member 3, and can be displaced with the latter in a bellows-like manner.

FIG. 2 shows the grip member 3 in a position where it has been pushed straight down, with illustration of the hand of the operator being omitted. In this straight down position, the pin 16 projects a distance "p2" out of the lower end 7 of the support means 1, with this distance "p2" being considerably greater than the distance "p1" that the pin 16 extends out of the end 7 when the upper end face of the grip member 3 contacts the pin 12. The difference between the distances "p1" and "p2" results in a switching path which, via a non-illustrated coupling switching linkage, is transmitted to an actuating element for the drive operation of the construction equipment.

The same switching path results somewhat forcibly when, as shown in FIG. 3, a radially directed force is exerted upon the grip member 3. In so doing, the conical surface of the recess 13 slides along the spherical head of the pin 12, whereby the grip member 3 is positively displaced downwardly in the direction toward the stop 14.

The relatively great forces that occur when the construction apparatus is being steered or guided are accommodated via the bores 4 and 5 in the ends 6 and 7 of the support means 1.

The switching path of the pin 16 can also lead to direct actuation of an electric switch, a hydraulic slide valve, etc., that is installed in a control circuit for the driving operation.

The present invention is, of course, in no way restricted to the specific disclosure of the specification and drawing, but also encompasses any modifications within the scope of the appended claims.

What I claim is:

1. A handgrip, having an operating position and having dead-man-switch action, for mounting on a pole of a self-propelled, pole-guided construction apparatus having a drive operation and including compacting equipment having rollers maneuvered and guided via the pole which is a shaft of predetermined length fastened to the rollers; said handgrip comprising:

support means adapted to be mounted on said pole of said construction equipment, with said support means being provided with stops;

a grip member that has a longitudinal direction, and that is displaceably supported between said stops of said support means in such a way that in the operating position of said handgrip, said longitudinal direction of said grip member is oriented substantially vertically; said grip member having a lower end, when viewed in said operating position of said handgrip, and an upper end; at least one of said ends of said grip member having a limited freedom of movement in a radial direction, i.e., substantially at right angles to said longitudinal direction of said grip member;

spring means disposed between said lower end of said grip member and a first one of said stops of said support means, with said spring means urging said grip member toward a second one of said stops;

positively acting slide coupling means provided between said support means and said grip member for displacing the latter relative to said support means in the longitudinal direction of said grip member, and against said spring means, when said grip member is shifted in the radial direction relative to said support means; and a switching member operatively connected to said grip member, and longitudinally displaceable along with the latter, for activation and deactivation of the drive operation of said construction apparatus when said grip member is longitudinally displaced.

2. A handgrip according to claim 1, which includes a sleeve that is mounted to said support means, surrounds said grip member, and is displaceable along with the latter in a bellows-like manner.

3. A handgrip according to claim 1, in which said slide coupling means comprises a pin that projects from said support means toward said upper end of said grip member and in the longitudinal direction of the latter, and also comprises a conical recess provided in said upper end of said grip member and facing said pin, with the latter forming said second one of said stops of said support means; at least said upper end of said grip member has a limited freedom of movement in the radial direction.

* * * * *